F. SAWFORD.
MEANS FOR INDICATING AND RECORDING THE CALORIFIC VALUE OF GASES.
APPLICATION FILED OCT. 18, 1907.
977,970.
Patented Dec. 6, 1910.
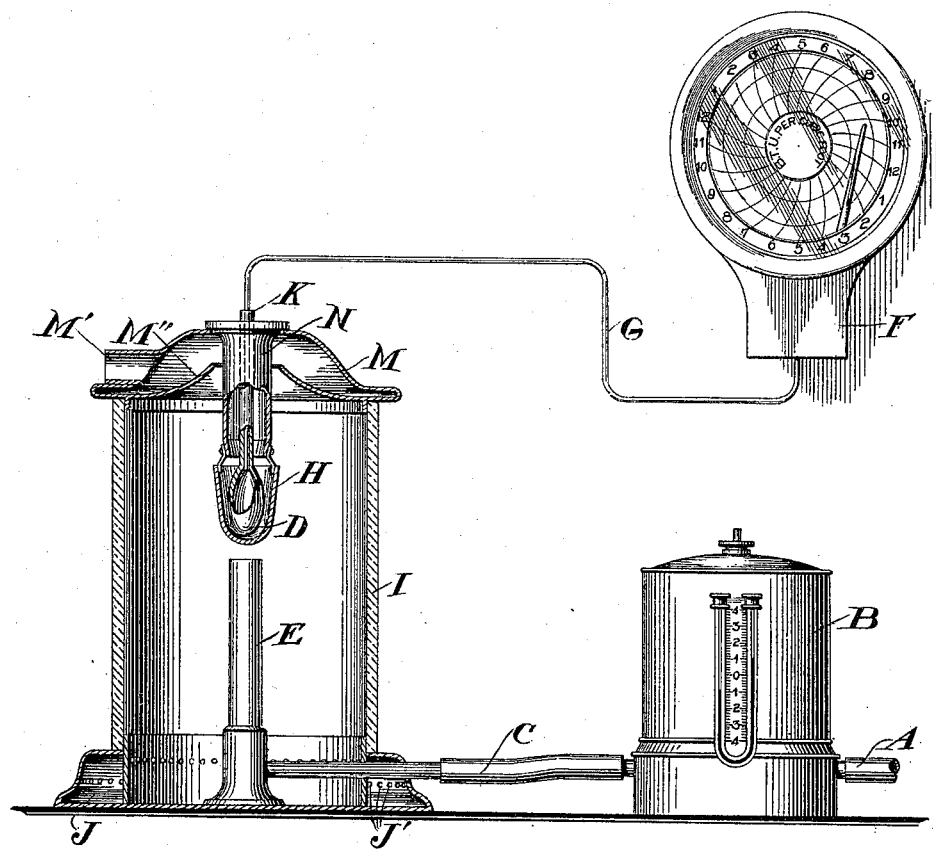

UNITED STATES PATENT OFFICE.

FRANK SAWFORD, OF SYDNEY, NOVA SCOTIA, CANADA.

MEANS FOR INDICATING AND RECORDING THE CALORIFIC VALUE OF GASES.

977,970.  Specification of Letters Patent.  Patented Dec. 6, 1910.

Application filed October 18, 1907. Serial No. 398,001.

*To all whom it may concern:*

Be it known that I, FRANK SAWFORD, a subject of Great Britain, now residing at Sydney, Nova Scotia, Canada, have invented certain new and useful Improvements in Means for Indicating and Recording the Calorific Value of Gases, of which the following is a specification.

This invention relates to means for indicating and recording the calorific value of gases.

When continuously generating or producing gas in industrial processes, the composition of the gas is variable and consequently the calorific value varies, rendering it necessary to take measurements from time to time to determine the calorific value of the gas. If the gas supplied to a calorimeter is maintained at a constant rate of flow, and under suitable conditions it is evident that the temperature due to combustion of the gas, will at all times be proportionate to its calorific value. The present invention utilizes this principle in a special manner, but whereas it has heretofore been proposed to measure the calorific value of a gas by measuring the temperature of the burned gases in the combustion chamber wherein a flame, supplied with the gas to be measured, is burning, such method is radically distinct from that which I have devised because in the present invention I propose to measure the calorific value of the gas by measuring the temperature of the flame itself without reference to the temperature of the burned gases within the chamber in which the flame is burning.

In those methods and calorimeters wherein it is proposed to burn a flame in a combustion chamber and to employ a recording thermometer which is influenced by the temperature of the burned gases, accurate measurement is impossible for several reasons. In the first place, it is necessary to maintain a constant temperature of the air and gas entering the combustion chamber and a constant pressure inside of said chamber, as also to insulate the combustion chamber to prevent any variation in external temperature from disturbing the internal temperature of the combustion chamber, while also the effect of insulating the combutions chamber is to cause a time-lag between the rise and fall in the calorific value of the gas, and the rise and fall in the temperature of the combustion chamber which is to say that, when the calorific value of the gas rises, the temperature of the whole combustion chamber must also rise, but the walls of the combustion chamber being slow to absorb heat, the temperature cannot rise at the ratio as of the calorific value; inversely, when the calorific value of the gas falls, the walls of the combustion chamber give off heat slowly, tending to maintain the temperature; consequently, what is actually measured is the resultant temperature, dependent on the rapidity of absorption of the walls of the combustion chamber and the rapidity in the rise and fall of the calorific value.

In the present invention I propose to provide a method of and apparatus for measuring and recording the calorific value of gases by which the temperature of the flame burning within the combustion chamber is measured directly without reference to the temperature of the burned gases or rest of the combustion chamber, and by so doing, through the instrumentality of certain novel means, I provide a method of and means for measuring calorific values of gases which is practically errorless.

In carrying out the invention, I inclose the flame, which is suitably supplied with the gas whose calorific value is to be measured, preferably after previous passage through a governor which will deliver the gas to said flame at a constant pressure, within a relatively large combustion chamber and associate a specially designed and shielded thermometer bulb which is attached to the capillary tube of a well known type of recording thermometer. This thermometer bulb is arranged in such fashion as to be subjected directly to the flame, and the temperature of the bulb is in direct proportion to the temperature of the flame as the heat received by the bulb is the heat of direct radiation from the shield, in consequence of which a true reading of the calorific value of the gas is obtained which is not subject to the temperature of the burned gases in the combustion chamber or to the temperature of the walls of the latter, and I have found that any variation in the temperature of the air entering the combustion chamber has no appreciable disturbing influence on the thermometer bulb.

The accompanying drawing is a view, partly in section, showing a calorimeter made in accordance with my invention.

The gas to be measured is introduced through a pipe A to a governor B of any preferred form, which regulates the flow of gas and delivers it at a constant pressure through a pipe C, regardless of any variation in pressure in the pipe A. The gas from pipe C passes to a suitable burner E contained within the calorimeter and resting upon a base J having a large number of perforations J' to subdivide the entering air and cause its uniform distribution through the combustion chamber within a shell or casing I, which may be of glass, metal or any suitable material, but this casing is designed to be of relatively large size as compared to the burner E. The burner E may be a Bunsen burner or the like, and when measuring illuminating gas, it would be used as such, but with producer or power gas, the air is not required to mix with the gas before combustion. At its top the casing or shell I is provided with a cap M which has an ample outlet M' and is provided with a frusto-conical deflector M'' whose open upper part is freely separated from a depending tubular shell N, which rests upon or is attached to the top of the cap M and depends centrally thereof, its lower end being contracted and open.

Attached to the top of the shell N and depending centrally thereof, is a steel tube K, which is made integral with or welded to an egg-shaped steel bulb D at its lower end below the shell N. Beneath and surrounding, but not touching, the bulb D, is a cup-shaped metal shield H which, as also bulb D, is disposed just above the upper end of burner E where it will directly receive the flame from said burner. The purpose of the shield H is two-fold: first, to prevent the flame from coming in direct contact with bulb D, as it has been found that in time the bulb becomes porous or spongy under the action of the burning gas, resulting in leakage of the air, gas or other fluid or the like contained within the bulb (as will appear presently) and; secondly, the shield spreads out the flame into a cylindrical form, causing it to completely envelop the bulb and thereby preventing the external air (needed for combustion of the gas under test) from coming into direct contact with the bulb, whereby the heat thus received by the bulb is by direct radiation from the shield, which in turn, being heated directly by the flame itself, enables a measurement of the temperature of the flame itself to be taken, giving a true reading of the calorific value of the gas.

Brazed to the top of the tube K, which is sealed, and extending down centrally within said tube and into the bulb D, is a steel capillary tube G which is made of that material rather than of copper as usual, because steel will permit the use of either air, inert gas or mercury as the expansive medium within the capillary tube G, whereas copper is not well adapted for use with mercury and with air, the copper tending to absorb the oxygen therefrom and thus lower the pressure. Consequently, I find it desirable to use a steel capillary tube G and while alcohol, air or mercury may be used, it is most desirable to have as the expansive medium an inert gas such as nitrogen, because with such a gas the expansion is in direct proportion to the temperature and insures an even scale.

The recording thermometer F is of a well-known type and needs no other explanation than that the expansion of the gas in the capillary tube G operates the pointer which makes the record on the dial.

While the use of the governor B is desirable, it is not essential to the proper working of the calorimeter and carrying out of the method, as I have found that variations in the gas pressure supplied to the burner E affect the indications of the instrument only to a very small degree.

Having thus described my invention, what I claim as new and desire to secure by Letters Patent, is:—

In a calorimeter, the combination with a combustion chamber, of a gas supplied burner whose flame is located within said chamber, a thermometer bulb located within the chamber in position to be enveloped by the flame from the burner, and a shield and flame distributer around the thermometer bulb and separated therefrom by an air insulating space, said shield being adapted to be enveloped by the flame.

In testimony whereof, I hereunto affix my signature in presence of two witnesses.

FRANK SAWFORD.

Witnesses:
 SADIE WOODILL,
 JOHN P. JOY.